(No Model.)

A. WOEBER.
DRILL CHUCK.

No. 508,667. Patented Nov. 14, 1893.

Witnesses
Raymond H. Barnes.
D. B. Gallatin.

Inventor
Amos Woeber
By P. T. Dodge
Attorney

THE NATIONAL LITHOGRAPHING COMPANY,
WASHINGTON, D. C.

United States Patent Office.

AMOS WOEBER, OF MOLINE, ILLINOIS.

DRILL-CHUCK.

SPECIFICATION forming part of Letters Patent No. 508,667, dated November 14, 1893.

Application filed August 6, 1892. Serial No. 442,360. (No model.)

*To all whom it may concern:*

Be it known that I, AMOS WOEBER, of Moline, county of Rock Island, and State of Illinois, have invented a new and useful Improvement in Drill-Chucks, of which the following is a specification.

My invention relates to drill chucks, the object being to provide a chuck of simple construction which will be capable of holding a drill securely and tightly under the varying conditions encountered in practice.

Heretofore drill chucks embodying spring jaws and a clamping device for contracting the jaws have been formed in different ways to hold drills of various constructions, but in all these devices, as far as I am aware, on the breakage of the drill, the latter could not be used again, and it was therefore necessary to replace it by a new one, thus entailing considerable expense.

My invention, in addition to other advantages, overcomes this objection, and consists of the chuck provided with jaws and a clamping device, the adjacent faces of the jaws being so formed as to present opposing spiral surfaces which are adapted to enter the spiral groove characteristic of the well known "twist" drill. In the use of a chuck formed in this manner the spiral faces of the jaws entering the groove in the drill and being clamped thereon, will hold the same securely and rigidly in position. By employing in connection with a chuck of this character a reversible twist drill, that is to say, a drill having a cutting edge at both ends and provided throughout its length with a spiral groove, in the event of the breakage of the drill either the outer detached portion or that clamped between the jaws may be used again.

The invention also consists in the details of construction and combinations of parts hereinafter described and claimed.

Figure 1:
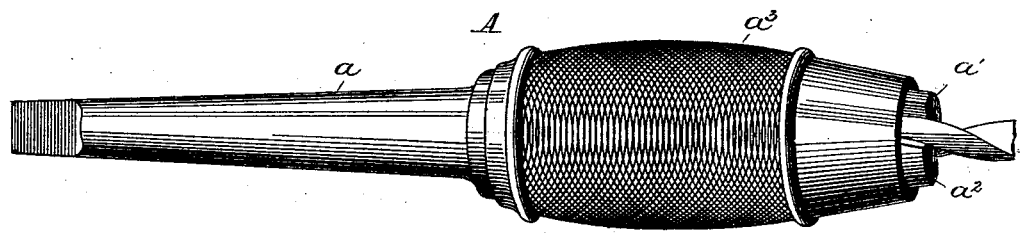
Figure 2:
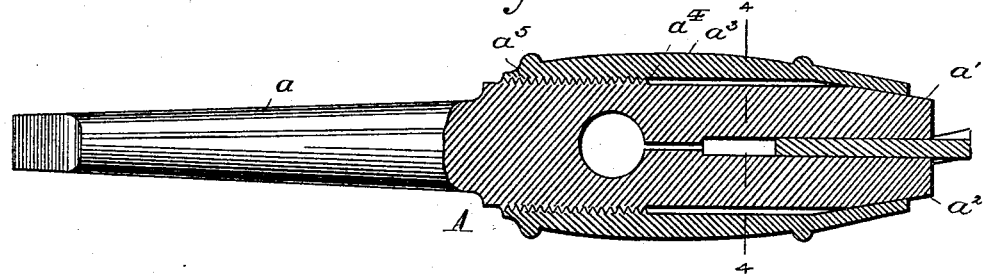
Figure 3:
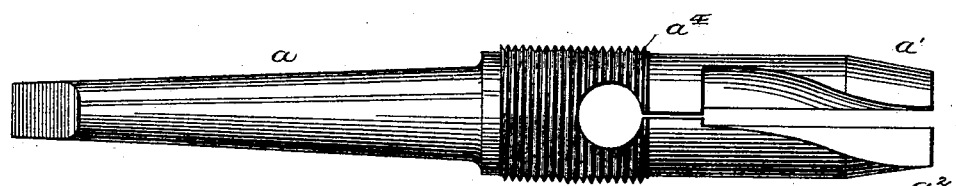
Figure 4:
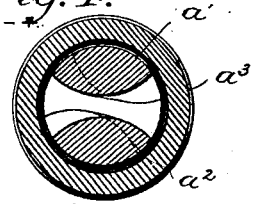
Figure 5:

In the accompanying drawings,—Figure 1 is a perspective view of my improved chuck with a drill held therein. Fig. 2 is a longitudinal section through the same. Fig. 3 is a side elevation with the clamping collar and drill removed. Fig. 4 is a cross-section on the line 4—4 of Fig. 1. Fig. 5 is a perspective view of the reversible drill.

Referring to the drawings, A represents a chuck comprising a shank $a$, two spring clamping jaws $a'$ $a^2$, and a clamping collar $a^3$. The shank is provided adjacent to the junction of the jaws with the same, with a thread $a^4$, adapted to engage an internal thread $a^5$, formed on the collar. The ends of the jaws are beveled, as shown, so that when the collar, which is also beveled on its interior, is screwed upon the shank, the beveled surfaces meeting, the jaws will be forced together against the drill.

The foregoing parts constitute a chuck of well known form and except in so far as indicated herein, they form no part of the present invention.

In applying my invention I form the inner adjacent faces of the jaws with spiral surfaces or ribs corresponding in shape to the spiral groove characteristic of the well known "twist" drill, the construction and arrangement being such that these spiral faces will enter the groove on opposite sides of the drill, and being forced together by the clamping collar, they will hold the drill securely and rigidly between them. Aside from the fact that a chuck of this character will effectually hold the drill in place by reason of the peculiar formation of the adjacent faces of the jaws, the construction described is of advantage where a reversible drill is employed, that is to say, a drill with a spiral groove extending throughout its length and having at both ends cutting edges. In the event of the breakage of a drill of this character either the outer detached portion may be used again, or that portion held between the jaws may be removed and reversed to bring its cutting edges outermost.

It will be observed that owing to the fact that the spring jaws may be forced toward each other to clamp the tool between them, different sized twist drills may be employed with one chuck, thus avoiding the necessity of providing drills of varying sizes with shanks of uniform dimensions.

Having thus described my invention, what I claim is—

1. In a drill chuck clamping jaws the active surfaces of which are curved in spiral lines, in combination with means for approximating said jaws.

2. In a chuck for twist drills, the combination with the shank or body, the jaws having their inner active surfaces convex in cross section and longitudinally twisted that they may enter the grooves of twist drills of various sizes and means substantially as described for drawing said jaws together.

3. In a drill chuck the combination with the shank of the resilient jaws having their inner adjacent faces formed to present spiral clamping surfaces adapted to fit the spiral grooves in the drill, and a clamping device for forcing said jaws together.

In testimony whereof I hereunto set my hand, this 16th day of June, 1892, in the presence of two attesting witnesses.

AMOS WOEBER.

Witnesses:
ELMER E. MORGAN,
FRANK J. CLENDENIN.